No. 613,880. Patented Nov. 8, 1898.
C. M. GREEN.
GENERATING AND DISTRIBUTING ELECTRIC ENERGY.
(Application filed Apr. 18, 1896.)
(No Model.)
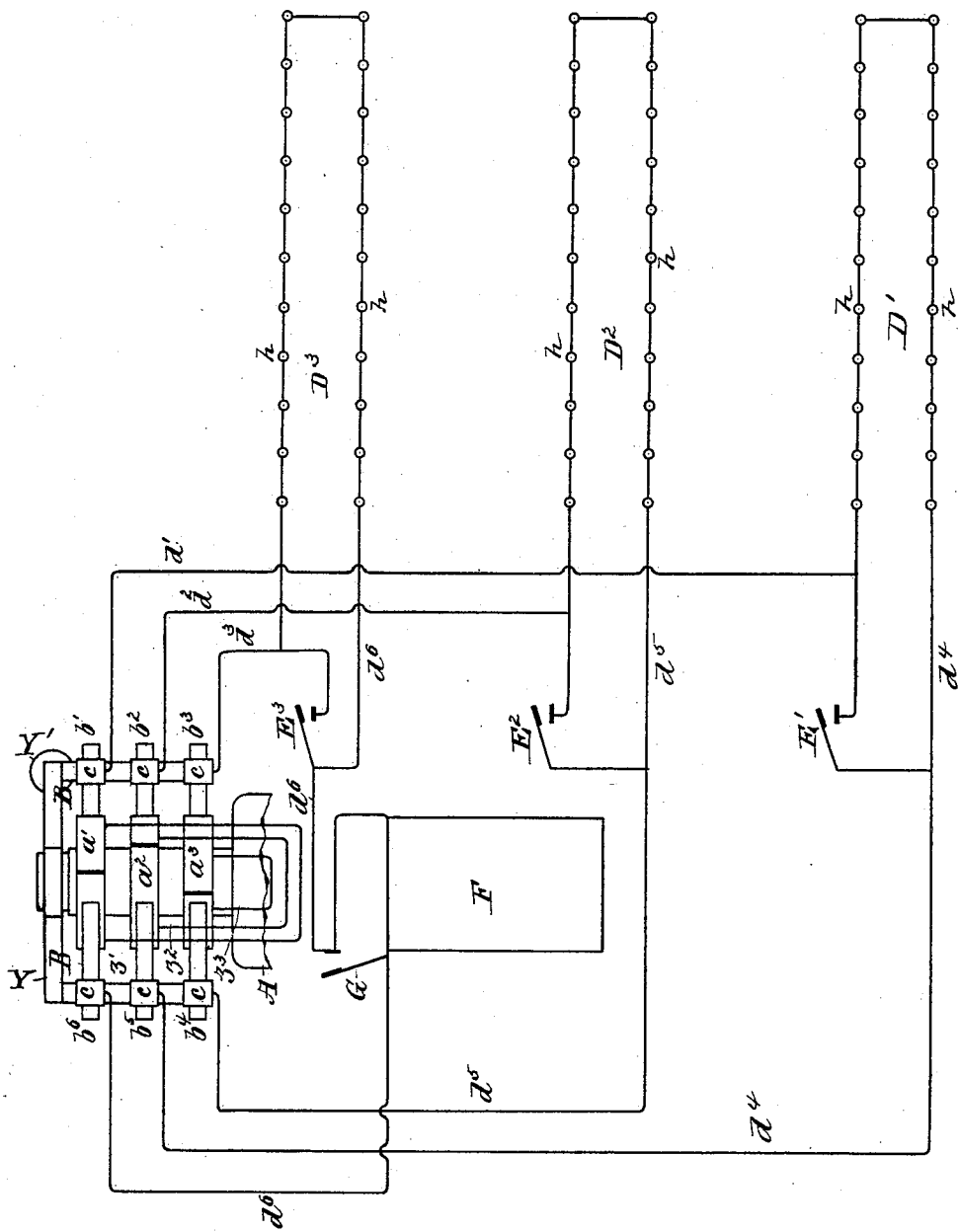

UNITED STATES PATENT OFFICE.

CHARLES M. GREEN, OF CLEVELAND, OHIO, ASSIGNOR TO THE GENERAL ELECTRIC COMPANY, OF NEW YORK.

GENERATING AND DISTRIBUTING ELECTRIC ENERGY.

SPECIFICATION forming part of Letters Patent No. 613,880, dated November 8, 1898.

Application filed April 18, 1896. Serial No. 588,108. (No model.)

*To all whom it may concern:*

Be it known that I, CHARLES M. GREEN, a citizen of the United States, residing at Cleveland, in the county of Cuyahoga and State of Ohio, have invented certain new and useful Improvements in Methods of and Systems for Generating and Distributing Electric Energy; and I do hereby declare that the following is a full, clear, and exact description of the invention, such as will enable others skilled in the art to which it appertains to make and use the same.

The object of my invention is to provide a method and system for generating and distributing electric energy which shall be capable of producing a total electromotive force of any desired amount and of so subdividing and distributing the total electromotive force generated that the difference of potential between any two points in the circuits or in the machine may be reduced to and maintained at any desired amount, and thus allow of the use of larger and more powerful dynamo-electric machines than can at present safely be employed.

With this object in view my invention consists in generating electromotive force in two or more separate sets or groups of armature coils or bobbins and in distributing the electromotive force so generated in separate circuits having translating devices included therein, said working or load circuits being connected between and included in series with the separate groups or sets of armature coils or bobbins.

My invention further consists in certain features of improvement and combinations of parts in my improved system of electric-current generation and distribution, as will hereinafter be described, and pointed out in the claims.

The accompanying drawing is a diagrammatic representation of one embodiment of my invention and illustrates the manner in which the invention may be employed in connection with dynamos capable of generating a high electromotive force suitable for electric-arc lighting.

A represents one end of an armature, which may be an open-coil or a closed-coil armature.

$a'$, $a^2$, and $a^3$ represent three separate commutator-rings, and $z'$, $z^2$, and $z^3$ represent three circuits, in each of which is included such a number of armature-coils of an open-coil armature or such a proportion of the armature-conductor of a closed-coil armature as will suffice to generate at any desired speed an electromotive force of, say, two thousand volts, and hence the total electromotive force which the machine will be capable of generating will be six thousand volts or more.

In the event an open-coil armature is employed the group of coils or bobbins included in any one of the circuits $z'$, $z^2$, and $z^3$ will be separate and distinct from the group of coils or bobbins included in any other of said circuits, whereby each group of coils or bobbins will be independent of every other group.

In the event a close-coiled armature is employed the armature-winding will be subdivided into as many separate and independent windings as there are commutator-rings, so that each one of such windings shall operate independently of the others in generating electromotive force sufficient in amount to energize the maximum number of translating devices that may be included in the circuit connected therewith.

B represents the brushes, of which it may be assumed that $b'$, $b^2$, and $b^3$ are the positive and $b^4$, $b^5$, and $b^6$ the negative brushes, while $c$ represents the brush-holders.

The commutator-brush holders are mounted in a suitable yoke $y$, which is connected with the solenoid $y'$ of an automatic regulator which serves to shift the brushes and automatically vary and regulate the output of electromotive force to correspond to the work or resistance that may be included in the external or working circuits of the machine. I have not deemed it necessary to illustrate or describe in detail the construction or mode of operation of the automatic regulator, because such devices are well known, and any suitable regulator may be employed in connection with a dynamo and circuits embodying my invention.

$D'$, $D^2$, and $D^3$ are the external or working circuits, in which are included any suitable translating devices, and for the sake of illustration it may be assumed that in each circuit there are included forty arc-lamps of fifty volts each, so that the load of each external circuit nearly balances the electromotive force generated in each one of the groups of armature coils or bobbins included in the circuits $z'$, $z^2$, and $z^3$.

The above conditions are desirable in practice, but they are not essential, since any one or more of the circuits may be cut out or any number of the lamps in either one of the circuits may be cut out, in which case the automatic regulator will operate to cut down the total output of electromotive force generated by the several groups of armature coils or bobbins to correspond to and operate the remaining lamps in circuit.

It is of course understood that the figures above given are for the purpose of illustration merely, although, in fact, they closely approximate the conditions that exist in actual practice, and that in practice the machine will have a capacity for generating an amount of electromotive force somewhat in excess of the amount expended in operating the lamps or other translating devices in the external circuits.

$d'$, $d^2$, and $d^3$ are the circuit-wires of the positive side and $d^4$, $d^5$, and $d^6$ those of the negative side of the external circuits.

$E'$, $E^2$, and $E^3$ represent switches or cut-outs for cutting out the external or working circuits whenever desired.

F represents the field-coils of the machine, and G a cut-out switch across the terminals thereof.

The arrangement of switches and circuit-wires as shown is diagrammatic merely, and it is to be understood that I do not confine myself to the particular arrangement of parts shown and described.

With the circuit connections as shown and all the cut-outs or switches open the electromotive force generated in the group or set of armature coils or bobbins included in circuit $z'$ and connected to commutator-ring $a'$ passes through circuit $D'$ and translating devices included therein and back to the negative side of the commutator-ring $a^2$. The difference of potential between any of the brushes of the commutator-rings $a'$ and $a^2$ will measure but slightly more than two thousand volts, while between $b'$ and $b^2$ it will be zero or substantially zero. The electromotive force generated in the group of armature coils or bobbins included in the circuit $z^2$ and connected to commutator-ring $a^2$ will pass through circuit $d^2$, the external or working circuit $D^2$ and translating devices included therein, and by circuit $d^5$ and brush $b^5$ to the commutator-ring $a^3$. The difference of potential between the commutator-brushes and the rings $a^2$ and $a^3$ will measure but slightly more than two thousand volts. The electromotive force generated in the group of armature coils or bobbins included in the circuit $z^3$ and connected to commutator-ring $a^3$ will pass by commutator-brush $b^3$ through circuit $D^3$ and translating devices included therein and then through the field-coils F of the machine to brush $b^6$ and to commutator-ring $a'$. The difference of potential between the commutator-brushes of the rings $a^3$ and $a'$ will measure but slightly more than two thousand volts. It will thus be found that the difference of potential between any two points on the machine or in the external circuits will but slightly exceed two thousand volts, notwithstanding that the machine is capable of generating a total electromotive force of six thousand volts or more.

A system of electric generation and distribution constructed in accordance with my invention possesses many advantages over the systems in general use, among which may be noted the following: It allows of the use of less expensive insulation, it involves less danger to the attendants and the public and to the machine, and renders it perfectly feasible and safe to employ machines of a capacity to operate five hundred arc-lamps, which would require a total expenditure of, say, twenty-five thousand volts, with a maximum difference of potential at any two points on the machine or external circuits not exceeding six thousand volts, and can be made lower than that amount, if so desired.

Having fully described my invention, what I claim as new, and desire to secure by Letters Patent, is—

1. A method of connecting a constant-current dynamo having two or more armature-circuits with two or more lamp-circuits consisting in arranging the connections so that one or more of the armature-circuits of the dynamo shall be interposed between the lamp-circuits and the voltage kept within safe working limits.

2. A system for the generation and distribution of electric energy which comprises a dynamo-electric machine, having two or more sets or groups of armature coils or conductors, and two or more working circuits, each of which is electrically connected between and in series with the sets or groups of armature-coils, substantially as and for the purpose set forth.

3. A system for the generation and distribution of electric energy which comprises a dynamo-electric machine having two or more sets or groups of armature coils or conductors, two or more working circuits each of which is electrically connected between and in series with the sets or groups of armature-coils, the field-circuit of the dynamo being electrically connected in series with the working circuits.

4. The combination with a dynamo having its armature-conductor subdivided into two or more separate groups or sets of coils or bobbins, and a separate commutator for each one of said groups or sets of coils, of two or more lamp-circuits, the terminals of each being electrically connected with the positive side of the commutator-ring of one group of armature-coils, and with the negative side of the commutator-ring of another group of armature-coils, substantially as set forth.

5. The combination with a dynamo having its armature-conductor subdivided into two or more separate groups or sets of coils, and a separate commutator for each set or group, of two or more lamp-circuits, each of which is electrically connected at one end with the positive side of the commutator of one group or set of armature-coils, and at its opposite end with the negative side of the commutator of another group or set of armature-coils, and switches for cutting out either one or all of said lamp-circuits, substantially as set forth.

6. The combination with a dynamo having its armature-conductor subdivided into two or more separate groups or sets of coils, and a separate commutator for each set or group, of two or more lamp-circuits each of which is electrically connected with the positive end of one group of armature-coils and with the negative end of another group of armature-coils, whereby the separate lamp-circuits and the separate groups or sets of armature-coils are connected in series with each other, substantially as set forth.

7. The combination with a dynamo-electric machine having its armature-conductor subdivided into two or more separate groups or sets of coils, a field-coil included in series with the armature-coils and working circuits, and a separate commutator for each set or group of armature-coils, of two or more lamp-circuits each of which is electrically connected at one end with the positive end of one group of armature-coils, and at its opposite end with the negative end of another group of armature-coils, substantially as set forth.

8. The combination with a dynamo having its armature-conductor subdivided into two or more separate groups or sets of coils or bobbins, a separate commutator and commutator-brushes for each set or group of armature-coils and a field-magnet common to all said groups of armature-coils, of two or more separate working circuits each of which has translating devices included therein in series, said groups of armature coils or bobbins, working circuits, and field-magnet, being connected in series, substantially as set forth.

9. The combination with a generator of electric energy, having its generating-conductor subdivided into two or more sets or groups, of two or more working circuits each of which is electrically connected between and in series with said sets or groups of generating-conductor, substantially as and for the purpose set forth.

10. A system for generating and distributing electric energy consisting of two or more sets or groups of generating coils or conductors, two or more working circuits, each of which is electrically connected between and in series with the sets or groups of generating coils or conductors and a regulator adapted to simultaneously and automatically regulate the electromotive force generated by all said sets or groups of generating coils or conductors to correspond at all times to the total resistance of the translating devices in operation, substantially as set forth.

In witness whereof I hereunto set my hand, in the presence of two witnesses, this 17th day of April, 1896.

CHARLES M. GREEN.

Witnesses:
   JNO. R. RYDER,
   WM. G. TAYLOR.